United States Patent
Crichton et al.

(10) Patent No.: US 8,060,922 B2
(45) Date of Patent: Nov. 15, 2011

(54) CONSUMER INTERNET AUTHENTICATION DEVICE

(75) Inventors: Mark A. Crichton, Woburn, MA (US); James J. Townsend, Brookline, NH (US)

(73) Assignee: EMC Corporation, Hopkinton, MA (US)

( * ) Notice: Subject to any disclaimer, the term of this patent is extended or adjusted under 35 U.S.C. 154(b) by 1363 days.

(21) Appl. No.: 11/303,752

(22) Filed: Dec. 16, 2005

(65) Prior Publication Data

US 2006/0174104 A1 Aug. 3, 2006

Related U.S. Application Data

(60) Provisional application No. 60/637,616, filed on Dec. 20, 2004.

(51) Int. Cl.
G06F 7/04 (2006.01)
G06F 15/16 (2006.01)
G06F 17/30 (2006.01)
H04L 29/06 (2006.01)

(52) U.S. Cl. .......................................................... 726/9
(58) Field of Classification Search ........................ None
See application file for complete search history.

(56) References Cited

U.S. PATENT DOCUMENTS 7,043,760 B2 * 5/2006 Holtzman et al. ............... 726/28
7,296,290 B2 * 11/2007 Barriga et al. ................... 726/8
2003/0105964 A1 * 6/2003 Brainard et al. ................ 713/178
2003/0163733 A1 * 8/2003 Barriga-Caceres et al. .. 713/201
2003/0200442 A1 * 10/2003 Bhat et al. ...................... 713/182
2004/0059952 A1 * 3/2004 Newport et al. ............... 713/202
2004/0078475 A1 4/2004 Camenisch et al.

FOREIGN PATENT DOCUMENTS

| WO | WO-02/49311 A | 6/2002 |
| WO | WO-03/005639 A | 1/2003 |
| WO | WO-03/073242 A | 9/2003 |

OTHER PUBLICATIONS

European Patent Office, International Search Report, mailed May 24, 2006, 4 pages.

* cited by examiner

*Primary Examiner* — Nasser Moazzami
*Assistant Examiner* — Trong Nguyen
(74) *Attorney, Agent, or Firm* — BainwoodHuang

(57) ABSTRACT

A method of allowing a user to authenticate to an authentication service while isolating information associated with the user from the authentication service includes generating a service user identifier (SUID) associated with an authentication code source, a subscribing site and an authentication service. The method includes creating an association of the SUID with the information associated with the user, and isolating the association within the subscribing site. The method includes providing an authentication code generated by the authentication code-generating device from the user to the subscribing site, and providing the authentication code along with the SUID and information identifying the subscribing site to the authentication service. The method includes identifying the code-generating device, using the SUID and the information identifying the subscribing site, and generating an authentication decision for the authentication code with respect to the code-generating device, and providing the decision to the subscribing site.

24 Claims, 7 Drawing Sheets

CONSUMER INTERNET AUTHENTICATION DEVICE

CROSS REFERENCE TO RELATED APPLICATIONS

This application claims benefit of the following Patent Applications: U.S. Provisional Patent Application Ser. No. 60/637,616, filed Dec. 20, 2004.

BACKGROUND OF THE INVENTION

The present invention relates to authentication systems.

Many organizations rely on strong authentication technology for functions related to interaction with their customers. For example, strong authentication technology may be used for a "gatekeeper" function, i.e., providing access to the organization's resources only if the customer can be authenticated as a valid user. In many cases, it is undesirable for such organizations to set up and maintain an authentication infrastructure. Accordingly, third party establishments have developed systems that provide an authentication service to such organizations. Traditionally these services are targeted towards an enterprise customer that leverages these authentication services to provide outsourced verification of user authentication credentials when accessing internal resources, such as Remote Access Servers, VPN, and Employee Portals.

The authentication services that exist today are focused on providing individual subscribing organizations with an individual authentication solution that they and only they can leverage. This approach requires a user of multiple subscribing organizations to carry a separate authenticating device for each subscribing organization, thus creating a situation where users are burdened with the number of devices that they manage, carry and use.

Limitations That Exist With Current Authentication Services

There are only a limited number of strong authentication services that are available to organizations today. However, these services typically include a direct link between the personal data associated with the user and the subscribing site that is known to the service.

With such a direct link into the personal data, the security of a user's identity is weakened instead of strengthened. The authentication service providers typically assume that the need for a direct link into this personal data is required to reduce management and token synchronization issues that can exist as devices are shared between organizations.

The existing services that offer an organization strong authentication are not currently seeking to leverage the single user device across multiple subscribing sites. Doing so has the potential to make the user's experience complex and confusing, which is obviously counterproductive for services trying to encourage wider use of strong authentication technology.

Existing authentication services do not offer a full complement of services surrounding the authentication. The centralization of authentication is only successful if the service can also offer direct end user device distribution, direct end user support and temporary access processes. Distribution is currently limited to bulk shipment of devices to the individual organizations and then requiring the individual organizations to distribute the devices themselves.

Conventional distribution models for authentication devices are typically based upon the authentication device being assigned to an individual prior to distribution. This type of authentication device distribution model suffers from significant limitations.

First, the conventional distribution model requires administrators to determine the relationship between the authentication device and the end user prior to actual distribution. An example that illustrates this limitation is the issuance of Credit Cards. Credit Cards are assigned to an individual user within the issuance process and are then distributed to that user.

Moreover, the process of pre-assigning the authentication device to the user causes a delay in the distribution process that can cause inconvenience to the user that is exacerbated in a consumer environment. Further, pre-assigning the security device can cause security breach if the device is intercepted and already bound to the user.

Given the current demand for a strong authentication service in consumer-facing applications and the limitations in the prior approaches, an approach for distribution of authenticators to end users that does not suffer from the limitations associated with the conventional authenticator distribution model is highly desirable. In particular, an approach for distribution of authentication devices to consumers that allows for the separation of distribution from the assignment of that authentication device to the user is needed.

There is a further need for an approach of authentication device distribution directly to end users on an "on demand" basis in a scalable timely manner that avoids the administrative burden that is used in the conventional distribution models.

SUMMARY OF THE INVENTION

The embodiments of the authentication service described herein provide global validation authentication credentials without the need for any specific user data to be held or validated by the authentication service. The described embodiments also provide a model of "abstracting" the authenticator from the authentications that are performed on the subscribing sites by utilizing multiple levels of indirection. These levels of indirection facilitate a single authenticator becoming associated to multiple subscribing sites and consumers. Replacement and temporary access credentials can also be utilized globally throughout the subscribing sites in the event a lost or temporary access event has occurred. The described embodiments ease the distribution burden in the authentication process and also in the replacement and distribution of authenticators.

The following sections describe concepts that are unique to the described embodiments of an authentication service.

Device Association

The described embodiments introduce the concept of "indirection," which refers to a relationship between the user (i.e., the entity desiring to utilize the resources of the subscribing site and providing authenticating information such as a passcode), the subscribing site (i.e., the entity hosting and controlling the desired resources) and the authentication service. In the described embodiments, the identity of the user is masked from the authentication service and is isolated to the subscribing site.

The masking occurs when the subscribing site activates the user's authentication device with respect to the authentication service. The activation process creates a pseudo-identifier, known herein as a Service User Identifier (SUID). The SUID is known only by the subscribing site and the authentication service. Once the authentication device is activated, the subscribing site stores and maps the identity of the user to the SUID, but never divulges any of the personal identifying information associated with the user to the service. The only link between the authentication service and the authentication device (and thus the user) is through the SUID, and only the subscribing site can relate the SUID to the personal identifying information associated with the user. For all authentication operations, the authentication service refers to the authentication device (and thus the user) by the SUID, without knowledge of the user's personal identifying information.

In one embodiment, when the user activates the authentication device with respect to the authentication service, the authentication service performs a cryptographic hash of (i) the subscribing site identifier, (ii) a unique identifier associated with the authentication device and (iii) a dynamic value (such as time of day), to compute the SUID. Although the SUID is described herein as being a function (e.g., a cryptographic hash) of information related to various components of the authentication system, in general the SUID can be any alternative identifier (pseudo identifier) that to some extent serves to abstract the authentication service from the authentications that are being performed. For example, simply using the serial number of authentication device is sufficient for such abstraction.

Authenticator Replacement

When a user loses his or her authentication device, or when the authentication device ceases to function, the user must replace the authentication device. For an authentication device that operates across multiple subscribing sites, the replacement procedure can involve activation with respect to each of the subscribing sites the device is bound against, an unwieldy task. To simplify the end user experience, at least one of the described embodiments takes an authentication device replacement request from a single subscribing site and handles replacement as a single event that is reflected across all subscribing sites to which the user is registered.

The described embodiment handles authenticator replacement by leveraging the SUID and its relationship with the subscribing sites, so that the user does not have to register his replacement authentication device at each subscribing site to which he is registered.

Lost Device—Temporary Access Code

As part of the authentication device replacement process described above, or as a separate temporary access process in the event the user is temporarily without the authentication device, one or more of the described embodiments can implement a "temporary access codes" (TAC) mode that allows a user to authenticate to the authentication service without using his issued authentication device.

If a subscribing site submits a request to enter an SUID into TAC mode, the authentication server generates a series of TAC's based on, but not limited to, a hash of random data and information related to that transaction or device. In addition to the creating this TAC, the authentication system also provides a "creation timestamp" value with this code that is sent back to the subscribing site and also held within the authentication system. The creation timestamp is used to allow subscribing sites to evaluate the length of time that at TAC was been created when used against their site, to determine different expiration policies.

The authentication system handles the authentication of a TAC by leveraging the SUID and the relationship that the SUID has with the subscribing sites, thereby relieving the user from having to request a TAC at each site to which they subscribe.

Lost Device—Recovery

Once an SUID has been assigned a TAC, the TAC is used to authenticate to the user until the time of expiration (defined by the aforementioned time to live value) is reached.

A TAC is issued as a method of authentication when an SUID is not able to use the issued authentication device. This could be due to the user losing the authentication device, or simply due to the user traveling and forgetting to bring the device along.

Should the latter occur, in one embodiment the original authentication device that is associated with the SUID can be re-enabled by simply entering valid authentication information (i.e., a valid passcode) from the authentication device in place of the TAC at any one of the subscribing sites.

The authentication service recognizes the valid authentication information, re-enables the authentication device with respect to the SUID, and removes the TAC that had previously been set, thereby preventing future reuse and compromise.

The authentication service handles the recovery of an original authentication device by leveraging the SUID and its relationship it has with the subscribing sites with which it is registered, so that the user does not need to re-enable their original authentication device at each site to which they subscribe.

Distribution of Authenticators

In the described embodiments, an authentication service provides an on demand distribution model that does not require administrative intervention. When the user submits an enrollment request to a subscribing site, the subscribing site relays the request to the authentication service and the authentication service distributes an authentication device directly to a physical address that is provided by the subscribing site.

In one embodiment, the authentication service does not record any physical characteristics of the authentication device, such as the serial number, or unique identification of the device, prior to the authenticator being distributed to the provided physical address. The authentication service distributes the authentication device to the requesting user without any administrative intervention by either the subscribing site or the authentication service. In other embodiments, the authentication service does maintain some information related to the authentication device, to facilitate administrative operations such as avoiding duplicate serial numbers.

When the end user receives the authentication device, the end user accesses the subscribing site that the enrolment request was made to perform an activation process, which binds the received authentication device to an SUID at the authentication service, as described above.

In one aspect, the invention is a method of isolating information associated with a user from an authentication service provider in an authentication system. The method includes providing information associated with the user along with information identifying an authentication code source, and providing the information identifying the authentication code source, along with information identifying a subscribing site, to the authentication service provider. The method also includes generating a service user identifier, and creating an association of the service user identifier and the information associated with the user, and isolating the association within the subscribing site.

In another aspect, method of isolating information associated with a user from an authentication service provider in an authentication system includes providing, from the user to a subscribing site, information associated with the user along with information identifying an authentication code source. The method further includes providing, from the subscribing site to the authentication service provider, the information identifying the authentication code source along with information identifying the subscribing site. The authentication service provider generates a service user identifier that is a predetermined function of at least the information identifying the authentication code source and the information identifying the subscribing site. The authentication service provider provides the service user identifier to the subscribing site. The method further includes creating an association of the service user identifier and the information associated with the user, and isolating the association within the subscribing site.

On embodiment of the method further includes storing a record of the service user identifier at the authentication service provider, along with the information identifying the authentication code source and the information identifying the subscribing site.

One embodiment includes delivering the authentication code source to the user.

In another embodiment, the user provides information associated with the user along with information identifying the authentication code source to at least a second subscribing site. The second subscribing site provides the information identifying the authentication code source along with information identifying the second subscribing site to the authentication service provider. The authentication service provider generates a second service user identifier that is a predetermined function of at least the information identifying the authentication code source and the information identifying the second subscribing site. The authentication service provider provides the second service user identifier to the subscribing site. The method further includes creating an association of the second service user identifier and the information associated with the user, and isolating the association within the second subscribing site.

In another embodiment, a second user provides information associated with the second user along with information identifying an authentication code source to the subscribing site. The subscribing site provides the information identifying the authentication code source along with information identifying the subscribing site to the authentication service provider. The authentication service provider generates a second service user identifier that is a predetermined function of at least the information identifying the authentication code source and the information identifying the subscribing site. The authentication service provider provides the second service user identifier to the subscribing site. The method further includes creating an association of the second service user identifier and the information associated with the second user, and isolating the association within the subscribing site.

In another embodiment, the subscribing site provides information regarding a first relationship between the user and the subscribing site, in addition to the information identifying the authentication code source and the information identifying the subscribing site to the authentication service provider. The method further includes the information regarding the first relationship between the user and the subscribing site in the generation of the service user identifier.

In one embodiment, the user provides information associated with the user along with information identifying the authentication code source to the subscribing site. The subscribing site provides the information identifying the authentication code source along with information identifying the subscribing site and information and information regarding a second relationship between the user and the subscribing site to the authentication service provider. The authentication service provider generates a service user identifier that is a predetermined function of at least the information identifying the authentication code source, the information identifying the subscribing site. The authentication service provider provides the service user identifier to the subscribing site. The method further includes creating an association of the service user identifier and the information associated with the user, and isolating the association within the subscribing site.

One embodiment further includes substituting an alternative service user identifier for the service user identifier originally generated. The alternative service user identifier is generated using information identifying a different authentication code source along with information identifying the subscribing site. One embodiment also includes delivering the different authentication code source to the user. Another embodiment includes providing the alternative service user identifier to the subscribing site.

One embodiment includes providing a temporary authentication code corresponding to the authentication code source. The authentication service provider generates the temporary authentication code, and associates the temporary authentication code with one or more service user identifiers stored at the authentication service provider. Subsequent authentications attempted with respect to the service user identifier are evaluated using the temporary authentication code and not an authentication code from the authentication code source. In one embodiment, the validity of the temporary password is limited to a predetermined duration. In one embodiment, the predetermined duration of validity of the temporary password is specific to each service user identifier, where one or more of the durations is different.

One embodiment further includes providing a replacement authentication code source to the user, and updating the service user identifier at the authentication service provider to be associated with information identifying the replacement authentication code source.

Another aspect is a method of allowing a user to authenticate to an authentication service provider while isolating information associated with the user from the authentication service provider. The method includes generating a service user identifier associated with an authentication code source, a subscribing site and an authentication service provider. The method further includes creating an association of the service user identifier with the information associated with the user, and isolating the association within the subscribing site. The method also includes providing a authentication code generated by the authentication code source from the user to the subscribing site, and providing the authentication code along with the service user identifier and information identifying the subscribing site to the authentication service provider. The method further includes identifying the authentication code source using the service user identifier and the information identifying the subscribing site, and generating an authentication decision for the authentication code with respect to the authentication code source. The method further includes providing the authentication decision to the subscribing site.

One embodiment includes allowing the user to log on to the subscribing site if the authentication decision indicates a valid authentication. Another embodiment includes allowing the user to utilize a function on the subscribing site if the authentication decision indicates a valid authentication.

Another embodiment includes the user providing additional information related to user validity to the subscribing site, and using the additional information for generating the authentication decision. In one embodiment, the additional information related to user validity includes at least one of (i) a personal identification number, (ii) a password, and (iii) biometric data associated with the user.

One embodiment further includes requesting, from the subscribing site to the user, resubmission of the authentication code generated by the authentication code source if the authentication decision indicates an invalid authentication. Another embodiment further includes the subscribing site providing additional information regarding a relationship between the user and the subscribing site to the authentication service provider. Yet another embodiment further includes storing, at the authentication service provider, information regarding the authentication decision, and providing the stored information to the subscribing site in response to a request from the subscribing site. In one embodiment, the subscribing site uses the stored information provided by the authentication service provider to verify a transaction executed by the user.

In another embodiment, the information regarding the service user identifier and the authentication decision includes the authentication code used for the authentication decision.

Another aspect is a method of regulating activities of a user on a subscribing site, including generating a service user identifier associated with an authentication code source, a subscribing site and an authentication service provider. The method further includes creating an association of the service user identifier with the information associated with the user, and isolating the association within the subscribing site. The method further includes the subscribing site receiving a request from the user for permission to perform an activity. The request includes an authentication code generated by the authentication code source. The method also includes providing the authentication code along with the service user identifier and information identifying the subscribing site to the authentication service provider, and identifying the authentication code source, using the service user identifier and the information identifying the subscribing site, and generating an authentication decision for the authentication code with respect to the authentication code source. The method also includes providing the authentication decision to the subscribing site, and granting permission for the user to perform the activity if the authentication decision indicates successful authentication, and denying permission for the user to perform the activity if the authentication decision indicates unsuccessful authentication.

Another aspect includes a system for isolating information associated with a user from an authentication service provider in an authentication system. The system includes a user having an authentication code source. The user provides information associated with the user along with information identifying an authentication code source to a subscribing site. The system also includes an authentication service provider for receiving, from the subscribing site, the information identifying the authentication code source along with information identifying the subscribing site. The authentication service provider (i) generates a service user identifier that is a predetermined function of at least the information identifying the authentication code source and the information identifying the subscribing site, (ii) provides the service user identifier to the subscribing site, and (iii) creates an association of the service user identifier and the information associated with the user, and isolates the association within the subscribing site.

Another aspect includes a system for allowing a user to authenticate to an authentication service provider while isolating information associated with the user from the authentication service. The system includes a user having an authentication code source, a subscribing site for providing a service to the user, and an authentication service provider for generating a service user identifier associated with the authentication code source, the subscribing site and the authentication service. The system also includes a network through which the user, the subscribing site and the authentication service provider communicate. The subscribing site creates an association of the service user identifier with the information associated with the user, and isolates the association within the subscribing site. The user provides, to the subscribing site, an authentication code generated by the authentication code source. The subscribing site provides the authentication code, along with the service user identifier and information identifying the subscribing site, to the authentication service provider. The authentication service provider (i) identifies the authentication code source using the service user identifier and the information identifying the subscribing site, (ii) generates an authentication decision for the authentication code with respect to the authentication code source, and (iii) provides the authentication decision to the subscribing site.

Another aspect includes a system for regulating activities of a user on a subscribing site. The system includes a user having an authentication code source, a subscribing site for providing a service to the user, an authentication service provider for generating a service user identifier associated with the authentication code source, the subscribing site and the authentication service, and a network through which the user, the subscribing site and the authentication service provider communicate. The subscribing site creates an association of the service user identifier with the information associated with the user, and isolates the association within the subscribing site. The user submits a request to the subscribing site for permission to perform a service activity, the request including an authentication code generated by the authentication code source. The subscribing site provides the authentication code along with the service user identifier and information identifying the subscribing site to the authentication service provider. The authentication service provider (i) identifies the authentication code source using the service user identifier and the information identifying the subscribing site, (ii) generates an authentication decision for the authentication code with respect to the authentication code source, and (iii) provides the authentication decision to the subscribing site. The subscribing site grants permission for the user to perform the service activity if the authentication decision indicates successful authentication, and denies permission for the user to perform the service activity if the authentication decision indicates unsuccessful authentication.

BRIEF DESCRIPTION OF DRAWINGS

The foregoing and other objects of this invention, the various features thereof, as well as the invention itself, may be more fully understood from the following description, when read together with the accompanying drawings in which.

DESCRIPTION OF THE PREFERRED EMBODIMENTS

The following sections provide a detailed description of an embodiment of a system for providing a consumer authentication service. The sections following this detailed description discuss several alternative variations of the described embodiment.

Figure 1:
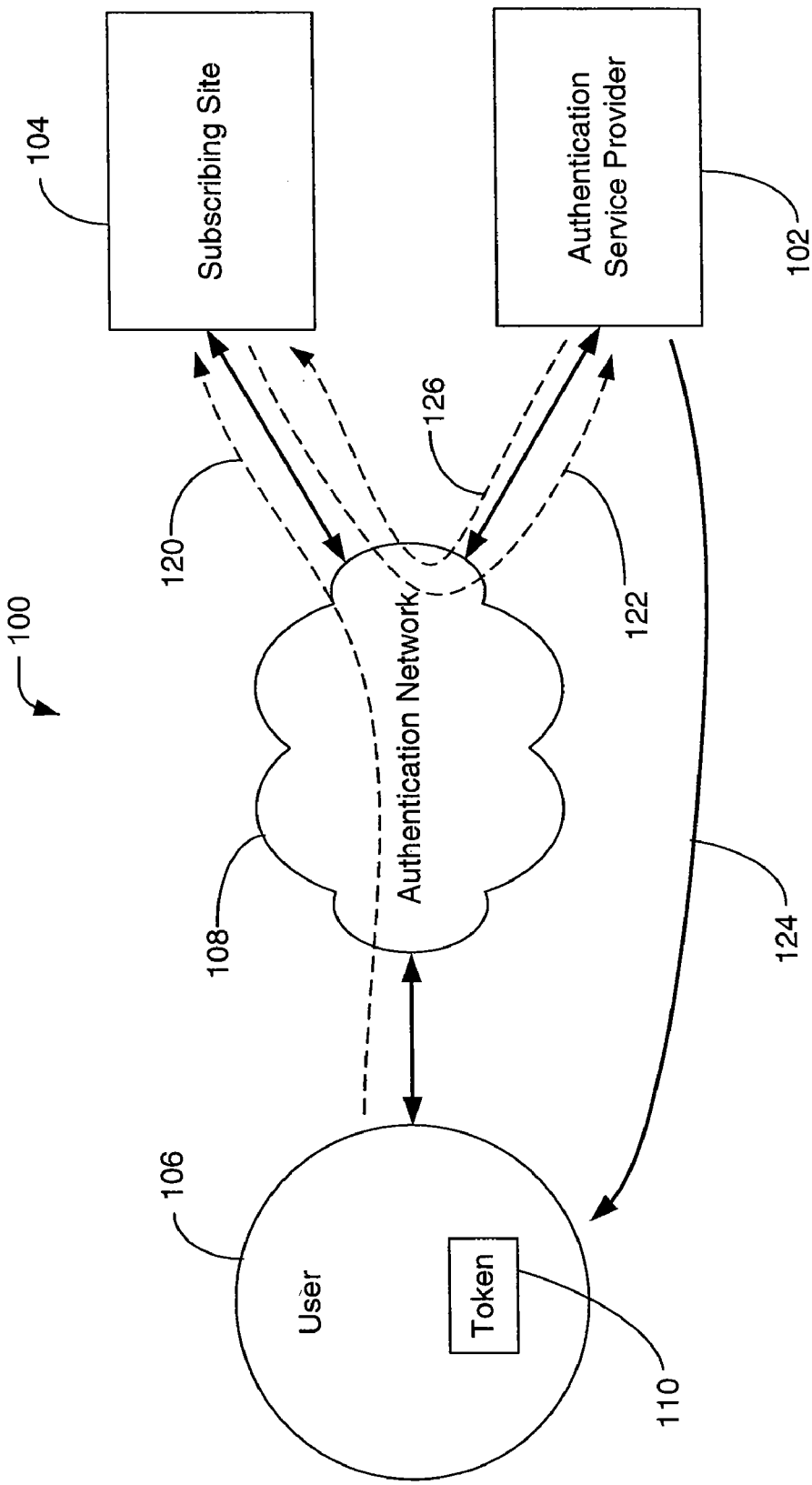
FIG. 1 illustrates an embodiment of a system for providing a consumer authentication service according to the invention.

FIG. 1 illustrates an embodiment of a system 100 for providing a consumer authentication service according to the invention. The system 100 includes an authentication service provider 102, a subscribing site 104 and a user 106 with an authentication code source (token) 110, all of which communicate with other components of the system 100 through an authentication network 108.

The authentication service provider 102 includes components necessary to communicate on the network 108, and validate an authentication code provided to it (for example, a one-time passcode) through the network 108, as well as components that provide various administrative functions related to other components of the system 100.

The subscribing site 104 is generally an individual, organization or enterprise that provides a service to consumers. One example of a subscribing site 104 is a financial institution such as a bank that allows customers to access online banking services.

The user 106 is typically an individual customer of the subscribing site 104, although the user 106 could alternatively be an organization or enterprise that utilizes the services the subscribing site 104 provides. The user 106 has an associated authentication device 110, also referred to herein as a token, that generates an authentication code.

In some embodiments, the token 110 is an electronic device that generates an authentication code and provides the authentication code through an output port. The output port may include an embedded display from which the authentication code is read, and submitted to the subscribing site 104 manually by the user. Or, the output port may include an interface port. The interface port may be a direct-connect hardware interface such as USB or FireWire, or a wireless interface such BlueTooth, WiFi, or an infrared light transceiver. Other interface techniques known in the art for propagating an authentication code may also be used.

In other embodiments, the token 110 is a software function running on a computing device (e.g., a personal computer or personal data assistant device) that is local to the user 106. In some embodiments, the token 110 is some combination of the hardware and software components described above.

In other embodiments, the token 110 is a printed or electronically stored source of authentication codes, such as a "scratch card," a "bingo card," a code list, or authentication codes electronically stored on a PDA or an "iPod," or similar device.

The authentication network 108 typically includes the Internet, although any wide area network capable of connecting the various components of the system 100 may be used.

Token Acquisition

The user 106 acquires the token 110 through any one of a number of different distribution chains. Typically, the user acquires the token by submitting a token request 120 to the subscribing site 104 as shown in FIG. 1. The subscribing site responds by sending a token request 122, including the physical address of the user 106, to the authentication service provider 102 on behalf of the user 106. The authentication service provider 102 then dispatches 124 the token 110 to the physical address of the user 106 via a delivery service. The delivery service may be any service available to the authentication service provider 102 such as, but not limited to, the US Postal Service, UPS, Federal Express, a private currier service, or a delivery service administered by the authentication service provider 102. The authentication service provider 102 may send an acknowledgement message 126 to the subscribing site confirming that the token 110 has been dispatched, although such an acknowledgment is not necessary.

In one embodiment, the token is distributed to the user 106 unsolicited, similar to how present day Internet Service Providers distribute advertising CDs containing information and software necessary to establish a service account. In another embodiment, the user 106 acquires the token 110 through a retail distribution outlet, similar to acquiring a cellular phone at an electronics store or a mall kiosk. For some embodiments, printed authentication codes can be distributed via magazines or other mass-market channels, or distributed via user access portals such as ATMs or via communications from the subscribing site (e.g., bank statements).

Token Activation Procedure

Figure 2:
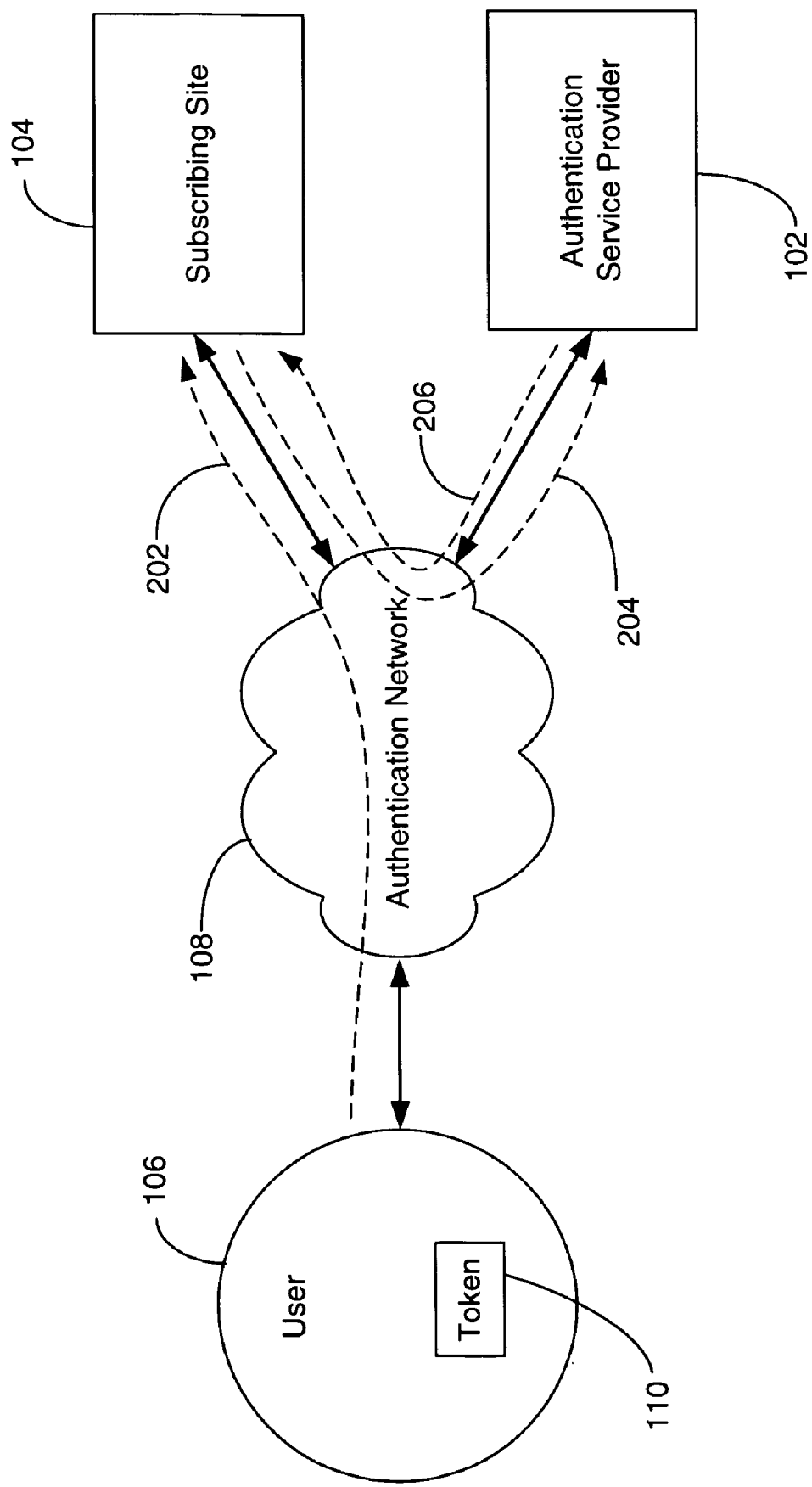
FIG. 2 shows a token activation process for the system of FIG. 1.

In one embodiment, once the user 106 acquires a token 110 as described above, the user activates the token 110, with respect to the subscribing site 104, against the authentication service provider 102. The activation process is illustrated in FIG. 2. The user 106 begins the activation process by sending an activation request 202 to the subscribing site 104, along with identifying information associated with the token (e.g., token serial number). The subscribing site may also require the user 106 to submit some user identifying information for the activation, although the service provider may already have such information stored from previous registration transactions.

In one embodiment, the user 106 activates the token at the application service provider 102, for example to indicate that the token 110 has been received. Subsequent binding of the user/token, subscribing site 104 and authentication service provider 102 occurs at the subscribing site.

In response to the activation request 202 from the user, the subscribing site 104 then sends an activation request 204 to the authentication service provider 102. The activation request 204 includes the token identifying information described above, as well as information identifying the subscribing site 104.

The authentication service provider 102 generates a service user identifier (SUID) as a function of (i) the token identifying information, and (ii) the subscribing site identifying information. In some embodiments, the SUID is also a function of a dynamic value (such as time of day or a counter value), or other data. The authentication service provider 102 creates and stores a record linking the generated SUID with the requesting subscribing site 104, and sends a response message 206 containing the SUID to the subscribing site 104.

In one embodiment, the subscribing site 104 creates a record linking the SUID to the user identifying information. Thus, the subscribing site 104, the user 106, the token 110, and the authentication service provider are bound together through the SUID. The authentication service provider 102 hereinafter refers to the token 110 by the SUID for authentication operations. The SUID identifies the token 110 and the subscribing site 104 to the authentication service provider, without divulging the user identifying information.

One or more embodiments may incorporate a policy that limits the ability to bind a subscribing site to a token once another subscribing site of a particular type has already been bound. For example, a subscribing site such as a bank or stock brokerage may wish to preclude binding of non-adjacent verticals subscribing sites (such as gambling or pornography sites) to a token once the financial institution has been bound to the token. This policy could also operate in the opposite direction, i.e., the financial institution may wish to preclude binding the financial institution once the token has been bound to a less reputable site.

Authentication Procedure

In operation, an authentication procedure is carried out when the user 106 wishes to access resources controlled by the subscribing site 104, or when the user wishes to perform a function (or have a function performed for him) at the subscribing site 104. Examples include, but are not limited to, logging on to an online banking system of a financial institution or an internal enterprise network, performing a stock purchase or trade, transferring funds from one account to another, scheduling an appointment via a health service provider's online access service, or renewing a prescription at an online prescription service provider. In each case, it is important for the subscribing site 104 to authenticate the user, to be certain that the user is authorized to access the desired resources and/or perform the desired function.

In one embodiment, the authentication procedure described herein may be used in a "nested" manner. For example, the subscribing site 104 may use a first authentication procedure to determine whether a customer should be allowed to log on to the subscribing site 104, and use a subsequent authentication procedure to determine whether the logged on customer should be allowed to perform a particular function. For this second authentication procedure, the subscribing site may determine that a weaker authentication criterion should be employed, since the fact that the customer was already allowed to log on indicates a particular level of trust. One example of a weaker authentication criterion is allowing "replay" of an authentication code, where normally such replay would be prohibited.

Figure 3:
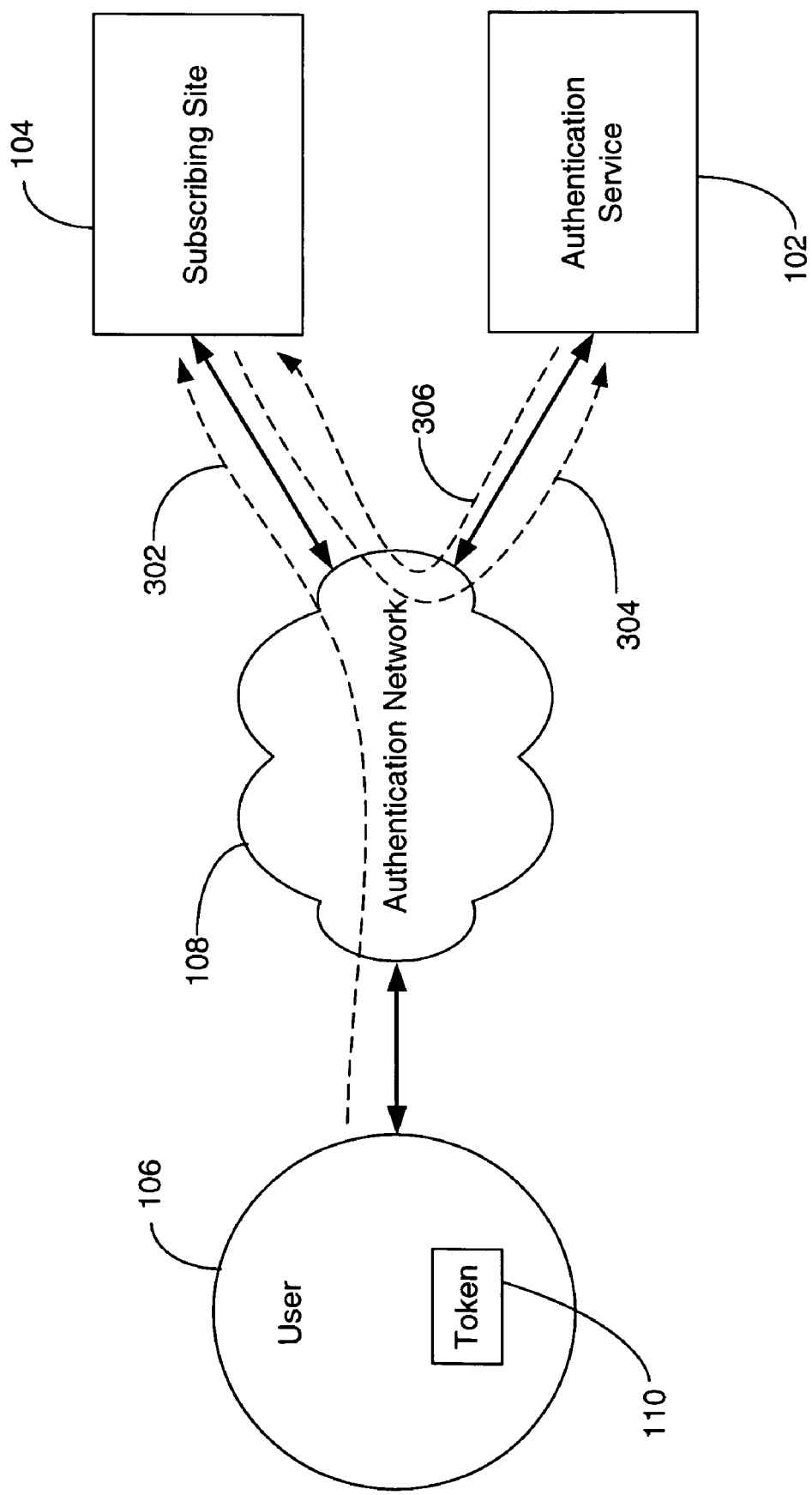
FIG. 3 shows an authentication procedure for the system of FIG. 1.

The user 106 begins the authentication procedure by submitting a request 302 to the subscribing site 104, as shown in FIG. 3. The request 302 includes user identifying information (such as a user name) and an authentication code generated by, or associated with, the token 110. It is understood that the user 106 may also be required to provide additional information for authentication, such as a personal identification number (PIN), biometric data, or other such information. However, for simplicity, the described embodiments relay only the authentication code.

Once it receives the request 302, the subscribing site 104 evaluates its stored records to determine if they contain an SUID that is associated with the user 106 and the token 110. If so, the subscribing site 104 submits an authentication request 304, including the SUID and the authentication code generated by the token 110 to the authentication service provider 102. In some embodiments, the authentication request may also include additional data indicating the nature of the authentication. For example, as described above, a subsequent authentication procedure may be entitled to a weaker authentication criterion. Or, the authentication procedure may be associated with a "time stamping" operation, as will be described in more detail below.

The authentication service provider 102 uses the SUID to determine the corresponding token 110 from its stored records. The authentication service provider 102 then evaluates the authentication code to calculate a valid/not valid decision for that token 110, and passes the valid/not valid decision 306 to the subscribing site 104.

Upon receiving the valid/not valid decision 306 from the authentication service provider 102, the subscribing site 104 uses the decision as it sees fit, depending upon the original purpose for requesting authentication. If, for example, the user 106 was requesting to log on the subscribing site 104, and the authentication fails, the subscribing site 104 in one embodiment responds to the user with a logon rejection message. Alternatively, the subscribing site may respond with a message requesting resubmission of the original request 302. If, on the other hand, the user 106 was requesting to perform a function, the subscribing site 104 responds with a function rejection message or a message directing resubmission of the original request 302.

In some embodiments, the subscribing site 104 generates the SUID based on user information, rather than relying upon the authentication service provider 102, so that the record search at the subscribing site 104 described above would not be necessary. Or, the subscribing site 104 may generate the SUID with assistance from the authentication service provider 102 or some other component of the consumer authentication service system.

Use of Authentication Service to Track Transactions

The description above focuses on a "gatekeeper" use of the authentication process, where the result of the authentication is to allow or disallow a particular action. A secondary use for the authentication process is to distinguish an operation or transaction in some way. For example, consider a financial institution that provides an online service for customers to allow stock trading. A customer uses this online service to execute a stock trade. In order to prove that the customer authorized the stock trade, or to audit the customer's transaction at a later date, it is useful to have each transaction time stamped with the time it occurred, and/or "signed" with information that is unique to the customer.

Thus, in one embodiment, the authentication service provider 102 maintains a record of the authentication valid/not valid decisions it generates. Each entry in this record includes a time stamp indicating when (date and time of day) the authentication transaction occurred, along with the SUID associated with the transaction and the authentication code provided by the user 106. The entry provides assurance that the user 106 authorized the transaction, since the user is assumed to have provided the authentication code associated with that particular SUID. Note that in the embodiments described above for which the subscribing site generates and maintains the SUID, the subscribing site maintains the record of the authentication valid/not valid decisions.

Some embodiments index the record of authentication transactions in some way for example, the authentication service provider 102 may index each transaction with a transaction number that is passed on to the subscribing site 104. In this case, the subscribing site retrieves the auditing information stored by the authentication service provider 102 by sending a request to the authentication service referencing the transaction number. In other embodiments, the authentication service provider simply indexes the transactions by the time and date at which they occurred, along with the SUID and the authentication code provided by the user 106. In this case, the subscribing site 104 retrieves the auditing information by sending an auditing request to the authentication service referencing the time and date of the transaction, along with the SUID.

In some cases, this secondary use of the authentication service (i.e., other than gatekeeping) assumes that the user 106 has already logged onto the subscribing site, the authentication procedure is being used in a nested manner, as described above. As such, the subscribing site 104 may determine that a weaker authentication is acceptable.

Benefits of the Use of SUID

Figure 4:
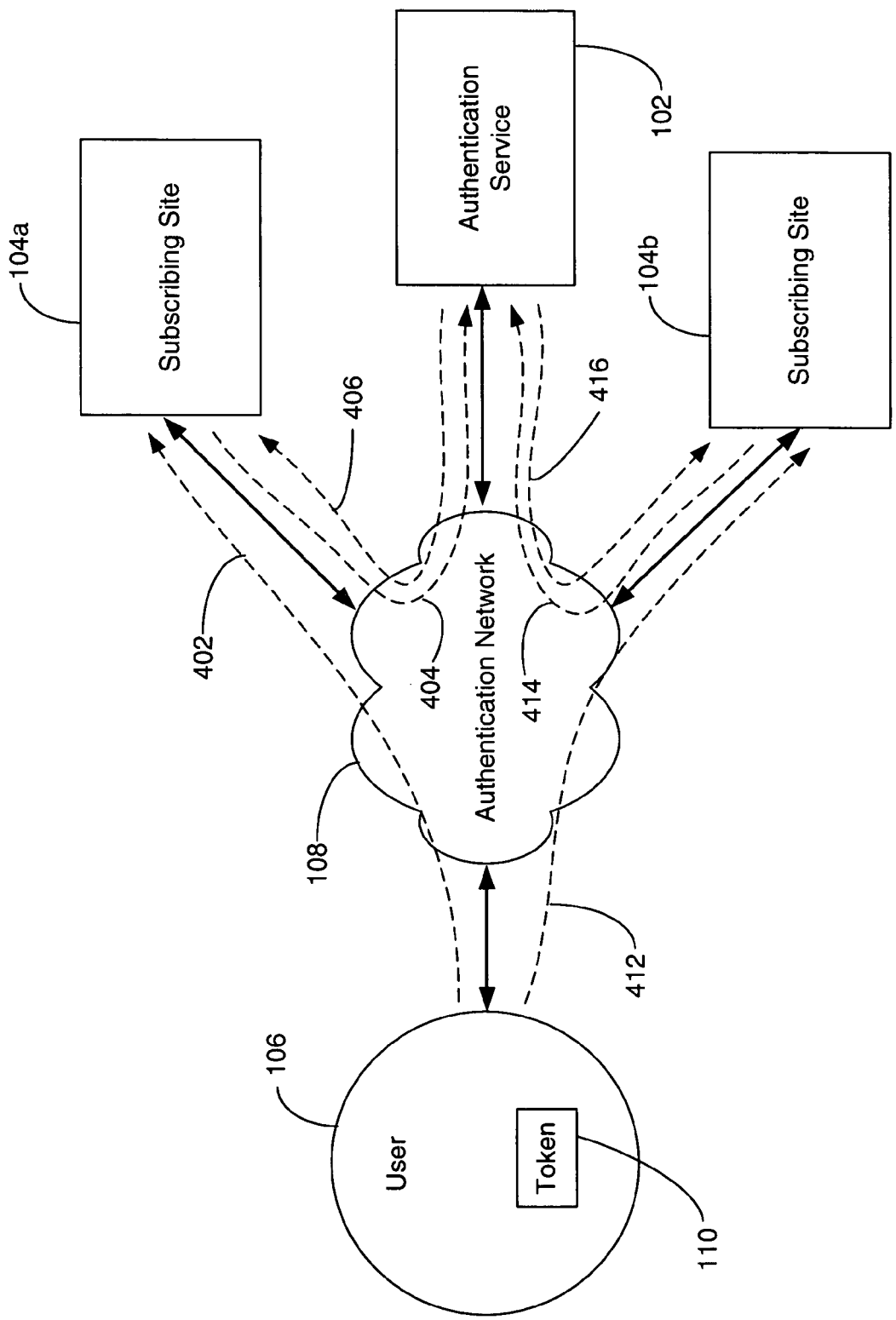
FIG. 4 shows the activation of a single token against two different subscribing sites.

The SUID described above binds together a user/token, a subscribing site and an authentication service provider. This fact may be used in a number of useful ways. For example, the SUID concept may be used to activate a single token against two or more subscribing sites, as illustrated in FIG. 4. Each activation proceeds as described above, thereby generating a unique SUID for each subscribing site.

The user 106 sends an activation request 402 to the first subscribing site 104a, along with identifying information associated with the token. In response to the activation request 402 from the user, the subscribing site 104a then sends an activation request 404 to the authentication service provider 102. The authentication service provider 102 generates a first service user identifier (SUIDa), in one embodiment as a function of (i) the token identifying information, (ii) identifying information associated with the first subscribing site 104a, and possibly a dynamic value or other data. The authentication service provider 102 creates and stores a record linking the first generated SUIDa with the requesting subscribing site 104a, and sends a response message 406 containing the first SUIDa to the subscribing site 104a.

The user 106 also sends a second activation request 412 to the second subscribing site 104b, along with identifying information associated with the token. In response to the activation request 412 from the user, the second subscribing site 104b then sends an activation request 414 to the authentication service provider 102. The authentication service provider 102 generates a second service user identifier (SUIDb) as a function of (i) the token identifying information, (ii) identifying information associated with the second subscribing site 104b, and possibly a dynamic value and/or other data. The authentication service provider 102 creates and stores a record linking the second generated SUIDb with the requesting subscribing site 104b, and sends a response message 416 containing the second SUIDb to the second subscribing site 104b.

This embodiment thus creates two SUIDs, SUIDa and SUIDb, each of which binds the user 106 and the authentication service provider 102 to a different subscribing site, either 104a or 104b. The authentication service provider 102 uses these distinct SUIDs to distinguish stored records, and link requests from different subscribing sites to the same token 110.

Figure 5:
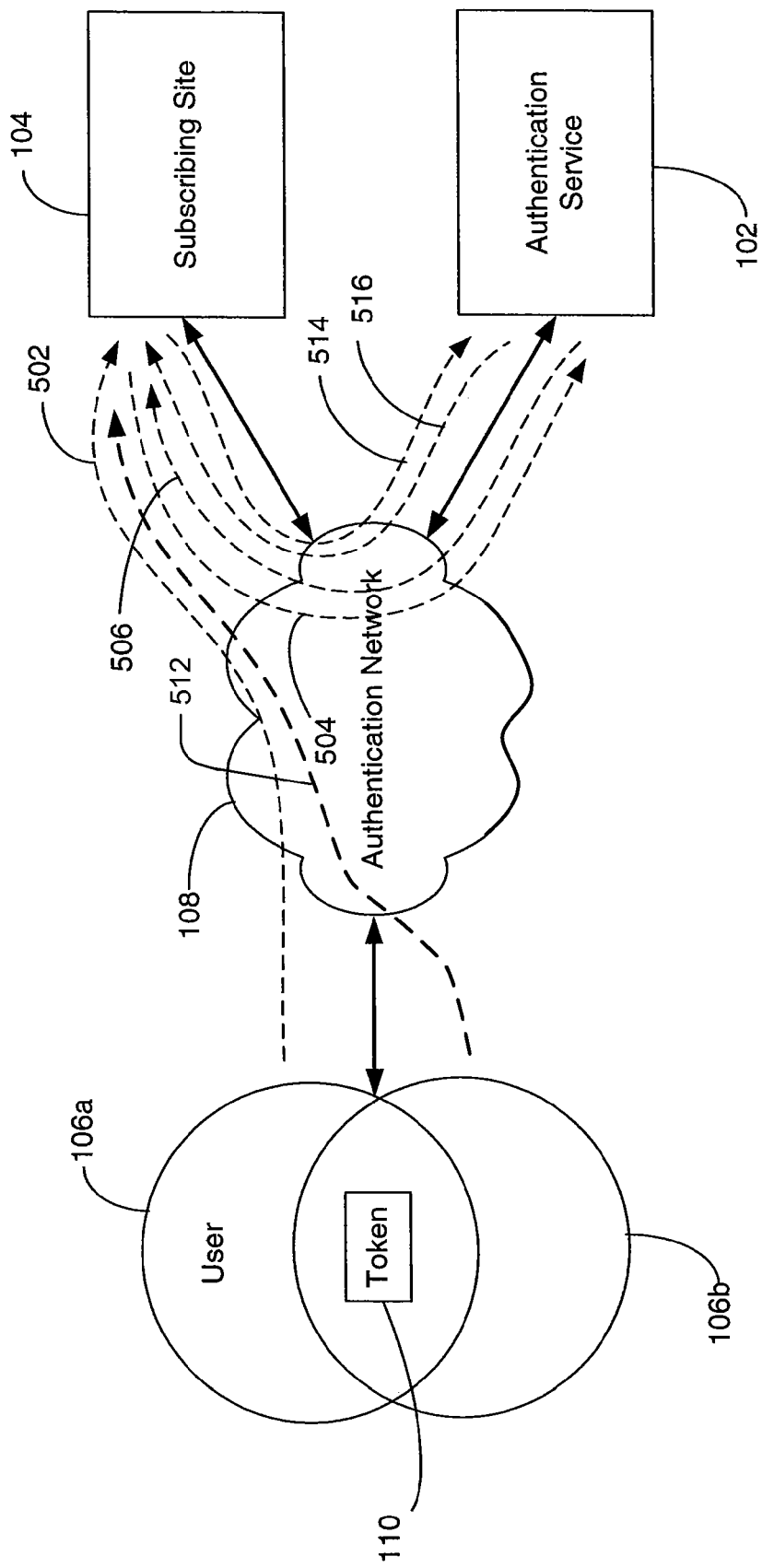
FIG. 5 shows the activation of a single token for two users.

Another use of the SUID concept is to allow two different users to use the same token to authenticate to a single subscribing site. For example, a husband and wife (or partners in an enterprise) may wish to use a common token to access individual accounts via an online banking service. A common token activation proceeds as shown in FIG. 5.

The first user 106a (User_a) sends an activation request 502 to the subscribing site 104, along with identifying information associated with the token. In response to the activation request 502 from the first user, the subscribing site 104 sends an activation request 504 to the authentication service provider 102. The authentication service provider 102 generates a first service user identifier (SUIDa) as a function of (i) the token identifying information, (ii) identifying information associated with the first subscribing site 104a, and possibly a dynamic value and/or other data. The authentication service provider 102 creates and stores a record linking the first generated SUIDa with the requesting subscribing site 104, and sends a response message 506 containing the first SUIDa to the subscribing site 104.

The second user 106b (User_b) also sends an activation request 512 to the subscribing site 104, along with identifying information associated with the token. In response to the activation request 512 from the user, the subscribing site 104 then sends an activation request 514 to the authentication service provider 102. The authentication service provider 102 generates a second service user identifier (SUIDb) as a function of (i) the token identifying information, (ii) identifying information associated with the subscribing site 104, and possibly a dynamic value and/or other data. The authentication service provider 102 creates and stores a record linking the second generated SUIDb with the requesting subscribing site 104, and sends a response message 516 containing the second SUID to the subscribing site 104.

This embodiment thus creates two SUIDs, SUIDa and SUIDb, each of which binds the authentication service provider 102 and the subscribing site 104 to a different user, either 106a or 106b. The authentication service provider 102 uses these distinct SUIDs to distinguish between the users for authentication operations and link them to the same token 110.

Other embodiments may use the basic techniques described above to bind various permutations of users/tokens, subscribing sites and authentication service providers, where each binding creates a unique SUID. For example, three or more users could each be bound through a single token to a subscribing site and an authentication service provider. Or, multiple users could be bound through a single token to two or more subscribing sites and an authentication service provider. Further, any of these scenarios could involve two or more authentication service providers.

In some cases a user has multiple accounts at a single subscribing site. For example, suppose a user has a first account at a bank for personal financial transactions, and also has a second account associated with a business venture. Another example is buyer at a company that controls the company's purchasing account at a bank, and also has a personal employee account at the same bank. Rather than using a separate token for each of the accounts, it would be more convenient for the user to be able to use a single token for both accounts. Using the concepts described above, a single token can be bound to the first account on the subscribing site and the authentication service provider, thereby creating a first SUID. The same token can also be bound to the second account on the subscribing site and the authentication service provider, creating a second SUID.

During the token activation process for this embodiment, the subscribing site sends an activation request to the authentication service provider with token identifying information and information identifying the subscribing site. The information identifying the subscribing site includes an additional field (such as a particular account number) that further identifies some aspect of the user and/or the subscribing site, so that the resulting SUID not only binds the token, subscribing site and authentication service provider, but also the particular aspect of the subscribing site, i.e., the user account residing on the subscribing site.

Deactivating an SUID

Figure 6:
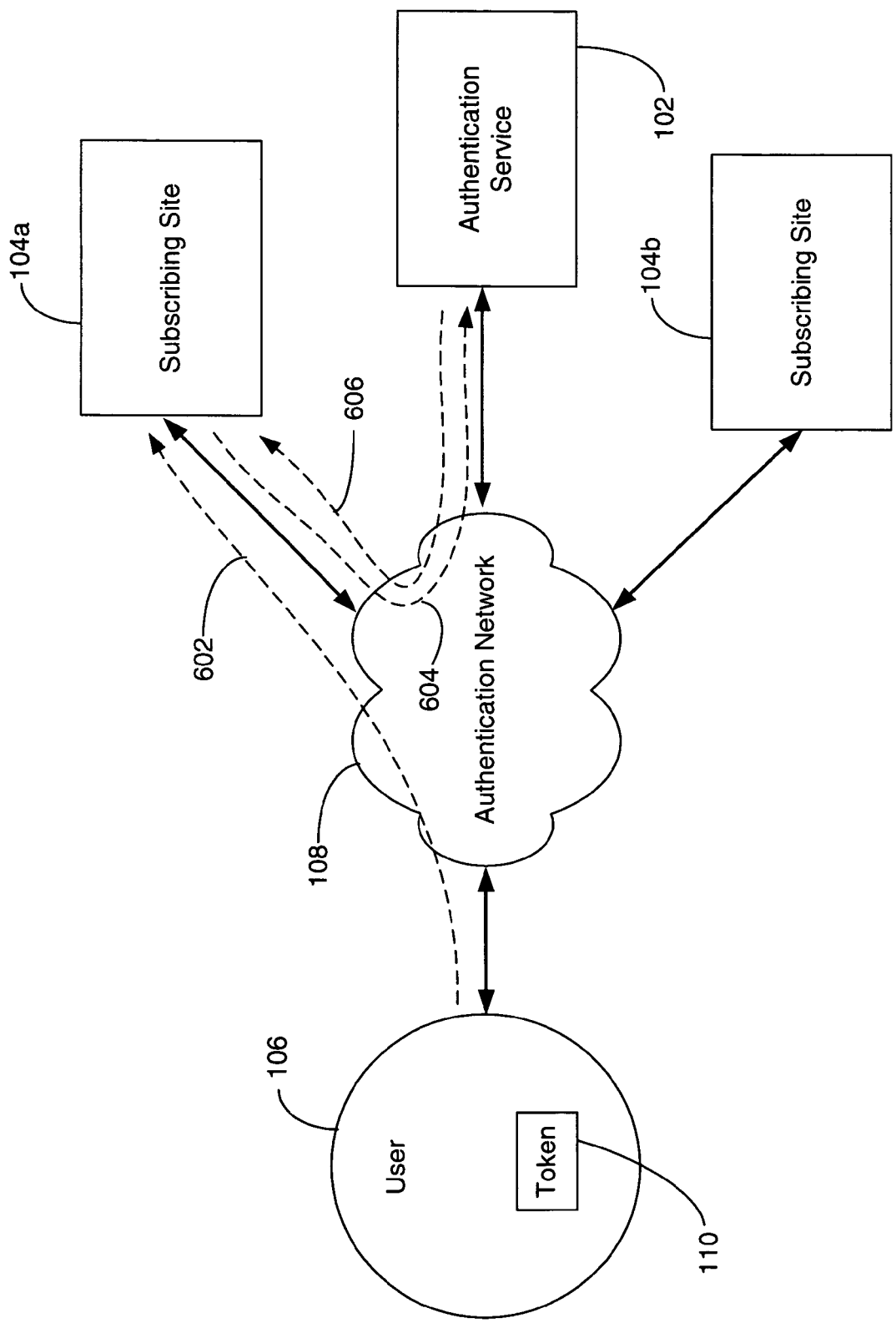
FIG. 6 shows a procedure for deactivating a token against an SUID.

The embodiments set forth above describe techniques for binding a single token to either multiple users, multiple subscribing sites, or multiple functions within one or more subscribing sites with an authentication service provider, by creating unique SUIDs. In some cases, however, it may be desirable to remove a token's association with one or more of these entities. For example, suppose a user has activated his token with respect to two different banks, but subsequently wishes to cease operations with one of the banks. FIG. 6 illustrates a procedure for deactivating an SUID.

In FIG. 6, the user 106 deactivates the SUID associated with the first subscribing site 104a. The user begins by sending a deactivation request 602 to the first subscribing site 104a, along with an authentication code from the token 110. The first subscribing site 104a authenticates the token as described above to allow the user 106 to log on (supposing, for example, the user does not have the token). Once the user 106 has logged on, the first subscribing site 104a sends a deactivation request 604 to the authentication service provider 102 along with the associated SUID and information identifying the subscribing site 104a. The authentication service provider 102 removes the entry corresponding to this SUID from its records, and sends an acknowledgement 606 that the SUID has been removed to the subscribing site 104a. The subscribing site 104a likewise removes the entry corresponding to this SUID from its records.

Once the SUID has been deactivated, the user 106 can no longer use the token 110 to authenticate with respect to this particular site 104a. However, any other SUIDs associated with this token 110 are still valid and may be used for authentication. Thus, for the example shown in FIG. 6, the user 106 can still authenticate, using the token 110, to the second subscribing site 104b using the SUIDb associated with that site.

Issuing a Temporary Password

In some circumstances, a user may require a temporary password. For example, if a user has lost or damaged his token, the user needs a temporary password until his token is replaced. Or, if a user has left his token at home, the user needs a temporary password until he retrieves his token.

Figure 7:
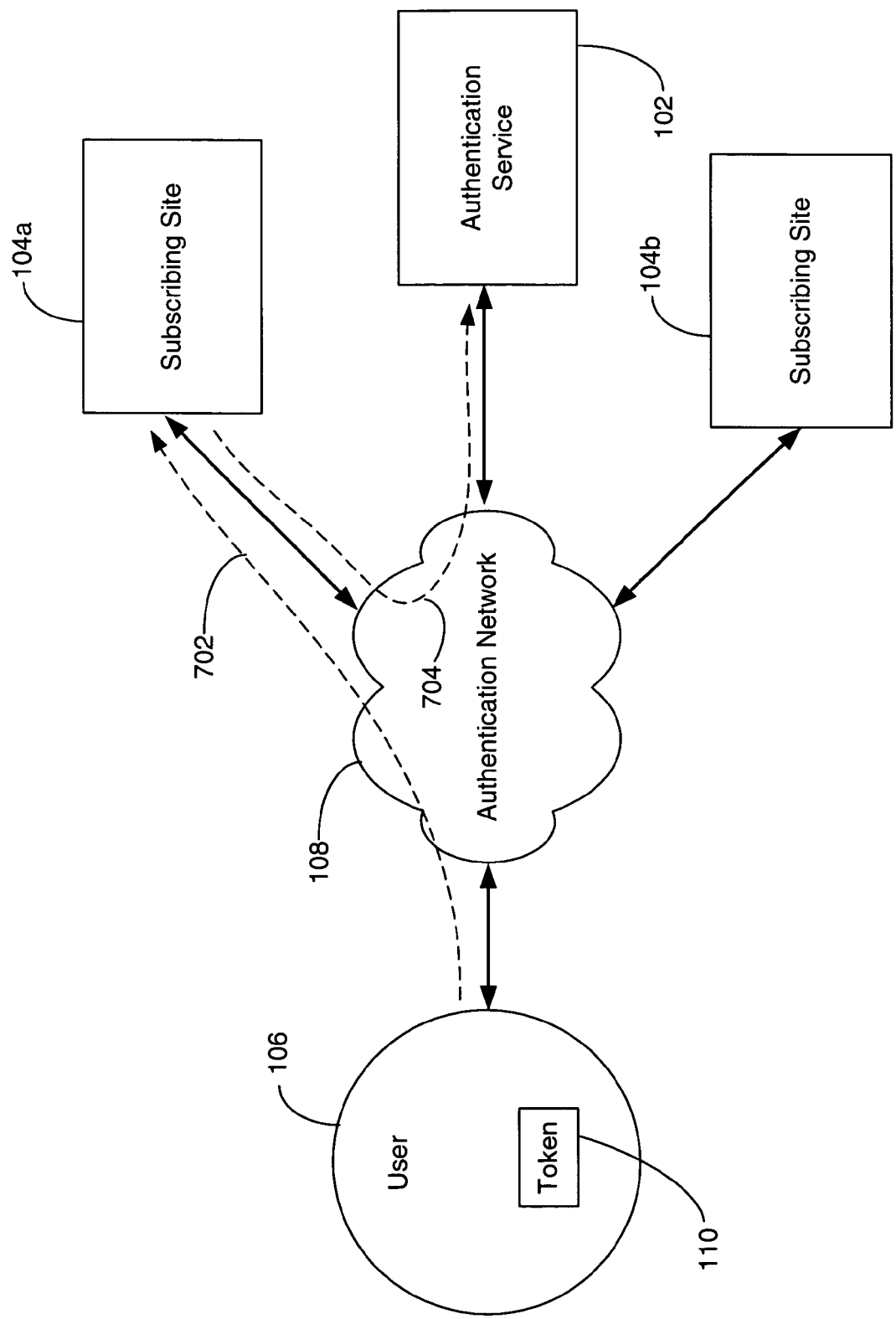
FIG. 7 shows a procedure for replacing a lost or damaged token.

In one embodiment, shown in FIG. 7, the user 106 requests a temporary password by sending a logon request 702 to a subscribing site, in this example subscribing site 104a. For the purposes of requesting a temporary password, the subscribing site provides a specific logon procedure that requires a lower authentication criterion (such as a PIN and/or password) or alternative authentication criteria (such as out-of-band life questions, e.g., what is your mother's maiden name), since the user cannot provide a token-based authentication code. Once logged on to the subscribing site 104a, the user 106 requests a temporary password. The subscribing site 104a sends a temporary password request 704 to the authentication service provider 102.

The authentication service provider 102 responds by generating a temporary password for the user 106. The authentication service provider then locates some or all of the SUIDs in its storage facilities that are associated with the user's temporarily unavailable token, and updates those SUIDs to be associated with the temporary password.

A benefit of this embodiment, due to the indirection afforded by the SUID concept, is that a user can request a temporary password from any subscribing site in the authentication network, and the temporary password will be reflected at all subscribing sites that are associated (through the SUIDs) with the unavailable token. In some embodiments, the subscribing sites are notified that a temporary password is in use, so that each subscribing site may limit operations to account for the reduced level of security inherent in the use of a temporary password.

Some embodiments apply policy decisions to the temporary passwords from subscribing site to subscribing site. For example, the temporary password issued may have different periods of validity (i.e., time of expiration) for different subscribing sites. This allows subscribing sites to set their own standards as to how long a temporary password should be valid.

Further, an embodiment may incorporate a policy that allows propagation of the temporary password across other particular subscribing sites only if the originating site has logon security in place that is greater than or equal to the other particular sites. For example, if subscribing site 104a requires a password, PIN and authentication code to log on, but subscribing site 104b only requires a valid e-mail address to log on, a policy rule would allow the user to generate a temporary password on subscribing site 104b, but not allow the temporary password to be used on subscribing site 104a.

Replacing a Token

In certain situations, for example when a user loses or accidentally damages his token, the user must procure a replacement token. Due to the indirection afforded by the SUIDs described above, the replacement task is relatively straightforward, as illustrated in FIG. 7.

In this embodiment, the user 106 begins the token replacement process by sending a logon request 702 to a subscribing site, in this example subscribing site 104a. For the purposes of replacing a token, the subscribing site provides a specific logon procedure that requires a lower authentication criterion (such as a PIN, life questions and/or password) or alternative authentication, since the user cannot provide a token-based authentication code. Once logged on to the subscribing site 104a, the user 106 requests a token replacement. The subscribing site 104a sends a token replacement request 704 to the authentication service provider 102.

The authentication service provider 102 then distributes the new token to the user 106 using any of the distribution techniques described above. (Note—the user may already have the new token, in the case of a token upgrade motivating the token replacement.) Once the user receives their replacement device they then request an activation of that device by logging on to the subscribing site and requesting an activation against their existing user record. The authentication service provider then locates some or all of the SUIDs in its storage facilities that are associated with the user's lost token, and updates those SUIDs to be associated with the new token.

In addition to sending the user the new token, in one embodiment the authentication service provider 102 also generates and distributes a TAC to the user as described above, so that the user 106 can authenticate while the new token is in transit. Alternatively, the user may receive a short-term list of temporary authentication codes. In another embodiment, the authentication service provider 102 does not automatically provide a temporary password, but rather requires the user to request a temporary password as described above.

Multiple Support Levels

Since the embodiments described herein utilize both the subscribing site 104 and the authentication service provider 102 to accomplish the authentication procedure, some of these embodiments provide the user 106 with multiple levels of maintenance and administrative support. In one embodiment, user support is distributed between the subscribing site 104 and the authentication service provider 102, depending upon the type of support the user needs. This embodiment may utilize, for example, three levels of support. Level 1 support includes basic "help desk" functions regarding the authentication fundamentals such as how to read the authentication code from the token, how to enter the authentication code to the subscribing site, how interpret message prompts and responses, and so on. Level 2 support includes more complex authentication issues such as why an authentication code is not being accepted. Level 3 support includes issues regarding malfunction of the authentication processes.

In general, the subscribing site 104 provides the Level 1 and Level 2 support (which both involve direct interaction with the user 106), while the authentication service provider 102 provides the Level 3 support. This support model removes much of the day-to-day user assistance from the authentication service provider 102 and places it on the individual subscribing sites. The subscribing sites 104 are in a much better position to provide such assistance, since many of the Level 1 and 2 issues that arise will be unique to the particular subscribing site.

For Level 2 support, the authentication service provider 102 provides an auditing function to the subscribing site 104. The auditing function provides information to the subscribing site 104 concerning the chain of events that caused problems for the user 106 in the authentication procedure. The auditing function thus gives the subscribing site visibility into the authentication procedure. By analyzing the information the auditing function provides, the subscribing site 104 determines which step in the authentication procedure led to the authentication failure. The subscribing site 104 then instructs the user how to correct the issue and authenticate properly.

The invention may be embodied in other specific forms without departing from the spirit or essential characteristics thereof. The present embodiments are therefore to be considered in respects as illustrative and not restrictive, the scope of the invention being indicated by the appended claims rather than by the foregoing description, and all changes which come within the meaning and range of the equivalency of the claims are therefore intended to be embraced therein.

What is claimed is:

1. A method of allowing a user to authenticate to a subscribing site using an authentication service provider while isolating information associated with the user from the authentication service provider, the subscribing site and authentication service provider being network nodes connected to a communications network, comprising:
by the authentication service provider, maintaining an association between an authentication code source and information identifying the authentication code source, the authentication code source being an electronic device operative to generate authentication codes to be used when accessing services at the subscribing site, the authentication service provider maintaining no association for authentication purposes between the information identifying the authentication code source and any personal identifying information of the user;
by the authentication service provider in response to an activation request from a subscribing site, the activation request including the information identifying the authentication code source, generating a service user identifier associated with (i) the authentication code source as identified by the information identifying the authentication code source in the activation request, and (ii) the subscribing site, and providing the service user identifier to the subscribing site over the communications network;
by the subscribing site, creating an association of the service user identifier with the information associated with the user, and isolating the association within the subscribing site;
by the subscribing site, receiving an authentication code generated by the authentication code source from the user;
by the subscribing site, generating an authentication request and forwarding the authentication request to the authentication service provider over the communications network, the authentication request including the authentication code received from the user along with the service user identifier and information identifying the subscribing site; and
by the authentication service provider, in response to receiving the authentication request from the subscribing site, (1) identifying the authentication code source using the service user identifier and the information identifying the subscribing site included in the authentication request, (2) generating an authentication decision for the authentication code included in the authentication request with respect to the identified authentication code source, and (3) providing the authentication decision to the subscribing site over the communications network,
and further including delivering the authentication code source to the user, wherein delivering the authentication code source is performed by distributing the authentication code source unsolicited by both the user and the subscribing site.

2. The method of claim 1, further comprising:
providing, from the user to the subscribing site, the information associated with the user along with the information identifying the authentication code source;
providing, from the subscribing site to the authentication service provider as part of the activation request, the information identifying the authentication code source as received from the user along with information identifying the subscribing site.

3. The method of claim 2, further including storing, at the authentication service provider, a record of the service user identifier along with the information identifying the authentication code source and the information identifying the subscribing site.

4. The method of claim 2, further including:
providing, from the user to at least a second subscribing site, information associated with the user along with information identifying the authentication code source, the second subscribing site being a network node on the communications network;
providing, from the second subscribing site to the authentication service provider over the communications network, the information identifying the authentication code source along with information identifying the second subscribing site;
generating, by the authentication service provider, a second service user identifier that is a predetermined function of at least the information identifying the authentication code source and the information identifying the second subscribing site;
providing, from the authentication service provider to the second subscribing site over the communications network, the second service user identifier; and,
creating an association of the second service user identifier and the information associated with the user, and isolating the association within the second subscribing site.

5. The method of claim 2, further including:
providing, from at least a second user to the subscribing site, information associated with the second user along with information identifying an authentication code source;
providing, from the subscribing site to the authentication service provider over the communications network, the information identifying the authentication code source along with information identifying the subscribing site;
generating, by the authentication service provider, a second service user identifier that is a predetermined function of at least the information identifying the authentication code source and the information identifying the subscribing site;
providing, from the authentication service provider to the subscribing site over the communications network, the second service user identifier; and,
creating an association of the second service user identifier and the information associated with the second user, and isolating the association within the subscribing site.

6. The method of claim 2, further including:
(i) providing, from the subscribing site to the authentication service provider over the communications network, information regarding a first relationship between the user and the subscribing site, in addition to the information identifying the authentication code source and the information identifying the subscribing site; and,
(ii) including the information regarding the first relationship between the user and the subscribing site in the generation of the service user identifier.

7. The method of claim 6, further including:
providing, from the user to the subscribing site, information associated with the user along with information identifying the authentication code source;
providing, from the subscribing site to the authentication service provider over the communications network, the information identifying the authentication code source along with information identifying the subscribing site and information regarding a second relationship between the user and the subscribing site;
generating, by the authentication service provider, a service user identifier that is a predetermined function of at least the information identifying the authentication code source, the information identifying the subscribing site;
providing, from the authentication service provider to the subscribing site over the communications network, the service user identifier; and,
creating an association of the service user identifier and the information associated with the user, and isolating the association within the subscribing site.

8. The method of claim 2, further including substituting an alternative service user identifier for the service user identifier originally generated, wherein the alternative service user identifier is generated using information identifying a different authentication code source along with information identifying the subscribing site.

9. The method of claim 8, further including delivering the different authentication code source to the user.

10. The method of claim 8, further including providing the alternative service user identifier to the subscribing site.

11. The method of claim 2, further including providing a temporary authentication code corresponding to the authentication code source, by:
generating, by the authentication service provider, a temporary authentication code;
associating the temporary authentication code with one or more service user identifiers stored at the authentication service provider, such that subsequent authentications attempted with respect to the service user identifier are evaluated using the temporary authentication code and not an authentication code from the authentication code source.

12. The method of claim 11, further including limiting validity of the temporary authentication code to a predetermined duration.

13. The method of claim 12, wherein the predetermined duration of validity of the temporary authentication code is specific to each service user identifier.

14. The method of claim 2, further including:
providing a replacement authentication code source to the user;
updating the service user identifier at the authentication service provider to be associated with information identifying the replacement authentication code source.

15. The method of claim 1, further including allowing the user to log on to the subscribing site if the authentication decision indicates a valid authentication.

16. The method of claim 1, further including allowing the user to utilize a function on the subscribing site if the authentication decision indicates a valid authentication.

17. The method of claim 1, further including providing, from the user to the subscribing site, additional information related to user validity, and using the additional information for generating the authentication decision.

18. The method of claim 17, wherein the additional information related to user validity includes at least one of (i) a personal identification number, (ii) a password, and (iii) biometric data associated with the user.

19. The method of claim 1, further including requesting, from the subscribing site to the user, resubmission of the authentication code generated by the authentication code source if the authentication decision indicates an invalid authentication.

20. The method of claim 1, further including providing, from the subscribing site to the authentication service provider, additional information regarding a relationship between the user and the subscribing site.

21. The method of claim 1, further including storing, at the authentication service provider, information regarding the authentication decision, and providing the stored information to the subscribing site in response to a request from the subscribing site.

22. The method of claim 21, wherein the subscribing site uses the stored information provided by the authentication service provider to verify a transaction executed by the user.

23. A method of regulating activities of a user on a subscribing site, comprising:
performing the method of claim 1, wherein the authentication code is received at the subscribing site from the user as part of a request by the user for permission to perform an activity, and
at the subscribing site, granting permission for the user to perform the activity if the authentication decision indicates successful authentication, and denying permission for the user to perform the activity if the authentication decision indicates unsuccessful authentication.

24. The method of claim 1, wherein generating the service user identifier includes perform a cryptographic hash of (i) the information identifying the subscribing site, (ii) a unique identifier associated with the authentication code source and (iii) a dynamic value.

* * * * *